US 6,575,377 B1

(12) United States Patent
Graves

(10) Patent No.: US 6,575,377 B1
(45) Date of Patent: Jun. 10, 2003

(54) MIXING VALVE

(75) Inventor: James C. Graves, Lake Forest, IL (US)

(73) Assignee: Watts Regulator Co., North Andover, MA (US)

( * ) Notice: Subject to any disclaimer, the term of this patent is extended or adjusted under 35 U.S.C. 154(b) by 0 days.

(21) Appl. No.: 10/086,265

(22) Filed: Mar. 1, 2002

(51) Int. Cl.[7] .............................................. G05D 23/13
(52) U.S. Cl. ..................................................... 236/12.2
(58) Field of Search ........................... 236/12.13, 12.2, 236/12.1, 12.11, DIG. 2; 137/597

(56) References Cited

U.S. PATENT DOCUMENTS

| 2,569,838 A | | 10/1951 | Vinson | |
|---|---|---|---|---|
| 2,575,043 A | | 11/1951 | Branson | |
| 2,620,133 A | | 12/1952 | Obermaier | |
| 2,826,367 A | * | 3/1958 | Cobb | ...................... 236/12.13 |
| 2,872,116 A | | 2/1959 | Kozel et al. | |
| 2,886,245 A | | 5/1959 | Giesler | |
| 2,905,387 A | | 9/1959 | Powell | |
| 2,978,182 A | | 4/1961 | Amneus | |
| 3,001,717 A | | 9/1961 | Rimsha et al. | |
| 4,475,684 A | | 10/1984 | Garlick et al. | |
| 4,541,562 A | | 9/1985 | Zukausky | |
| 4,669,653 A | | 6/1987 | Avelov | |
| 5,011,074 A | * | 4/1991 | Kline | ...................... 236/12.13 |
| 5,148,976 A | * | 9/1992 | Reid | ......................... 236/12.2 |
| 5,161,737 A | | 11/1992 | Olmsted et al. | |
| 5,205,483 A | * | 4/1993 | Kostorz | ...................... 236/12.2 |
| 5,340,018 A | * | 8/1994 | MacDonald | ............... 236/12.2 |
| 5,341,987 A | | 8/1994 | Ackroyd | |
| 5,350,112 A | | 9/1994 | Stein | |
| 5,379,936 A | | 1/1995 | Kline | |
| 5,462,224 A | | 10/1995 | Enoki et al. | |
| 5,647,531 A | | 7/1997 | Kline et al. | |
| 6,085,984 A | * | 7/2000 | Chamot et al. | ............. 236/12.2 |
| 6,109,288 A | * | 8/2000 | Al-Hamlan | .................. 137/114 |
| 6,119,947 A | | 9/2000 | Couture et al. | |
| 6,250,559 B1 | * | 6/2001 | Knauss | ........................ 236/12.2 |
| 6,315,209 B1 | * | 11/2001 | Tripp | ....................... 236/12.13 |
| 6,315,210 B1 | | 11/2001 | Kline | |
| 6,364,210 B1 | * | 4/2002 | Lorch | ......................... 236/12.2 |

FOREIGN PATENT DOCUMENTS

| AU | 124388 | 6/1947 |
|---|---|---|
| DE | 1 287 781 | 1/1969 |

* cited by examiner

Primary Examiner—William E. Tapolcai
Assistant Examiner—Mohammad M. Ali
(74) Attorney, Agent, or Firm—Fish & Richardson P.C.

(57) ABSTRACT

A mixing valve includes a manifold, a temperature-responsive device, a first by-pass mechanism, and a second by-pass mechanism. The manifold defines a cold fluid inlet, a hot fluid inlet, a fluid outlet in fluid communication with the cold fluid inlet and the hot fluid inlet, and a mixing chamber in fluid communication with the cold fluid inlet, the hot fluid inlet, and the fluid outlet. The temperature-responsive device is capable of regulating the relative volumes of flow from the fluid inlets to the mixing chamber. The first by-pass mechanism is responsive to the pressure of cold fluid flow in the manifold to allow cold fluid to flow between the cold fluid inlet and the fluid outlet. The second by-pass mechanism is associated with the temperature-responsive device and is responsive to a temperature in the manifold to allow cold fluid to flow between the cold fluid inlet and the fluid outlet.

30 Claims, 7 Drawing Sheets

MIXING VALVE

TECHNICAL FIELD

This invention relates to a mixing valve for supplying fluid to a fluid outlet.

BACKGROUND

Mixing valves can be used to supply tempered, e.g., tepid, water to a water outlet. In some embodiments, cold water from a supply source flows to a cold water inlet, and hot water from a supply source flows to a hot water inlet of the mixing valve. The cold and hot water are mixed in the valve, and mixed, tempered water is directed through a tempered water outlet.

The mixing valves can be used in commercial and/or industrial applications such as, for example, in emergency drench showers and eyewash stations. The tempered water allows a user to rinse relatively comfortably for an adequate amount of time.

SUMMARY

This invention relates to a mixing valve.

In one aspect, the invention features a mixing valve including a manifold, a temperature-responsive device, a first by-pass mechanism, and a second by-pass mechanism. The manifold defines a cold fluid inlet, a hot fluid inlet, a fluid outlet in fluid communication with the cold fluid inlet and the hot fluid inlet, and a mixing chamber in fluid communication with the cold fluid inlet, the hot fluid inlet, and the fluid outlet. The temperature-responsive device is capable of regulating the volume of flow from the hot and cold fluid inlets to the mixing chamber. The first by-pass mechanism is responsive to pressure of cold fluid flow in the manifold to allow cold fluid to flow between the cold fluid inlet and the fluid outlet. The second by-pass mechanism is associated with the temperature-responsive device and is responsive to fluid temperature in the manifold to allow cold fluid to flow between the cold fluid inlet and the fluid outlet.

Embodiments may include one or more of the following features. The temperature-responsive device is associated with a first sealing surface and a second sealing surface, the manifold further defines a first seat configured to engage with the first sealing surface, and a second seat configured to engage with the second sealing surface, and the temperature-responsive device is responsive to changes in fluid temperature to control positioning of the first and second surfaces relative to the first and second seats, respectively. The temperature-responsive device is configured to regulate the relative volumes of flow from the cold and hot fluid inlets to the mixing chamber in response to a predetermined temperature setting.

The first by-pass mechanism can be responsive to a pressure differential between cold fluid flow and a constant force, e.g., applied by a spring. The first by-pass mechanism may include a first body and a second body associated with the first body, the second body being responsive to a pressure differential and movable relative to the first body to allow flow of cold fluid through the first body. The first body may slidably receive the second body. The second by-pass mechanism may be associated with the first by-pass mechanism, and may be capable of increasing cold fluid flow allowed by the first by-pass mechanism. The first and second by-pass mechanisms may be mechanically coupled.

In another aspect, the invention features a mixing valve including a manifold defining a cold fluid inlet, a hot fluid inlet, a fluid outlet in fluid communication with the cold fluid inlet and the hot fluid inlet, a mixing chamber in fluid communication with the cold fluid inlet, the hot fluid inlet, and the fluid outlet, a first seat, and a second seat; a temperature-responsive device associated with a first sealing surface configured to engage with the first seat, and a second sealing surface configured to engage with the second seat, the temperature-responsive device being responsive to changes in temperature to adjust positioning of the first and second surfaces relative to the first and second seats, respectively, the positions of the first and second surfaces regulating the flow of cold and hot fluids to the mixing chamber; a first by-pass mechanism responsive to the pressure of cold fluid from the cold fluid inlet to allow cold fluid to flow between the cold fluid inlet and the fluid outlet; and a second by-pass mechanism responsive to a temperature detected by the temperature-responsive device to allow cold fluid flow between the cold fluid inlet and the fluid outlet.

In another aspect, the invention features a method of supplying temperature-regulated fluid. The method includes flowing cold fluid from a cold fluid inlet of a manifold to a fluid outlet of the manifold in response to a pressure of cold fluid from the cold fluid inlet, and flowing cold fluid from the cold fluid inlet to the fluid outlet in response to a temperature of fluid flowing to the fluid outlet.

Embodiments may include one or more of the following features. The method further includes regulating flow of cold fluid from the cold fluid inlet to the fluid outlet, and regulating flow of hot fluid from a hot fluid inlet to the fluid outlet. The method further includes flowing cold fluid in response to the pressure and flowing cold fluid in response to the temperature when flow of hot fluid to the fluid outlet is restricted. The method further includes flowing cold fluid in response to the pressure and flowing cold fluid in response to the temperature when a temperature-responsive device in the manifold malfunctions. The method further includes contracting a portion of the temperature-responsive device. The method further includes restricting flow of hot fluid from a hot fluid inlet of the manifold to the fluid outlet.

In another aspect, the invention features a method of supplying cold fluid to a fluid outlet of a valve manifold when its hot flow path is restricted or when a temperature-responsive device malfunctions, the manifold defining a first cold fluid flow path from a cold fluid inlet of the manifold to the fluid outlet of the manifold, and the hot fluid flow path from a hot fluid inlet of the manifold to the outlet. The method includes flowing cold fluid from the cold fluid inlet to the fluid outlet through a second path different than the first cold fluid flow path in response to a pressure differential, and flowing cold fluid from the cold fluid inlet to the fluid outlet through a third path different than the first and second paths in response to a temperature of fluid flowing to the fluid outlet.

Embodiments may include one or more of the following features. The method includes regulating cold fluid flow through the first flow path, and hot fluid flow through the hot fluid flow path with a temperature-controlling device. The method further includes restricting the flow of hot fluid through the hot fluid flow path when the flow of cold fluid through the first path is restricted. The method further includes restricting flow of hot fluid through the hot fluid flow path when the temperature-responsive device in the manifold malfunctions. The method further includes restricting flow of cold fluid through the first flow path when the temperature-responsive device in the manifold malfunctions. The method further includes contracting a portion of the temperature-responsive device when the temperature-responsive device malfunctions.

The invention provides a mixing valve, for example, for use with an emergency drench shower, an eye/face wash station, or a combination shower and eye/face wash station. Under normal operation, the mixing valve can provide tempered water of a predetermined maximum temperature. The risk of scalding or burns from hot water is thus reduced. Under certain circumstances, such as a hot water failure or a controlling device failure, the mixing valve is capable of safely providing cold water using a by-pass mechanism, such as a dual by-pass mechanism activated by pressure and temperature. The invention further provides a mixing valve having a one-piece design for convenient installation. The mixing valve offers good performance while complying with certain safety requirements, such as OSHA's ANSI Z358.1-1998.

Other features and advantages of the invention will be apparent from the description of the preferred embodiments thereof and from the claims.

DETAILED DESCRIPTION

Figure 1:
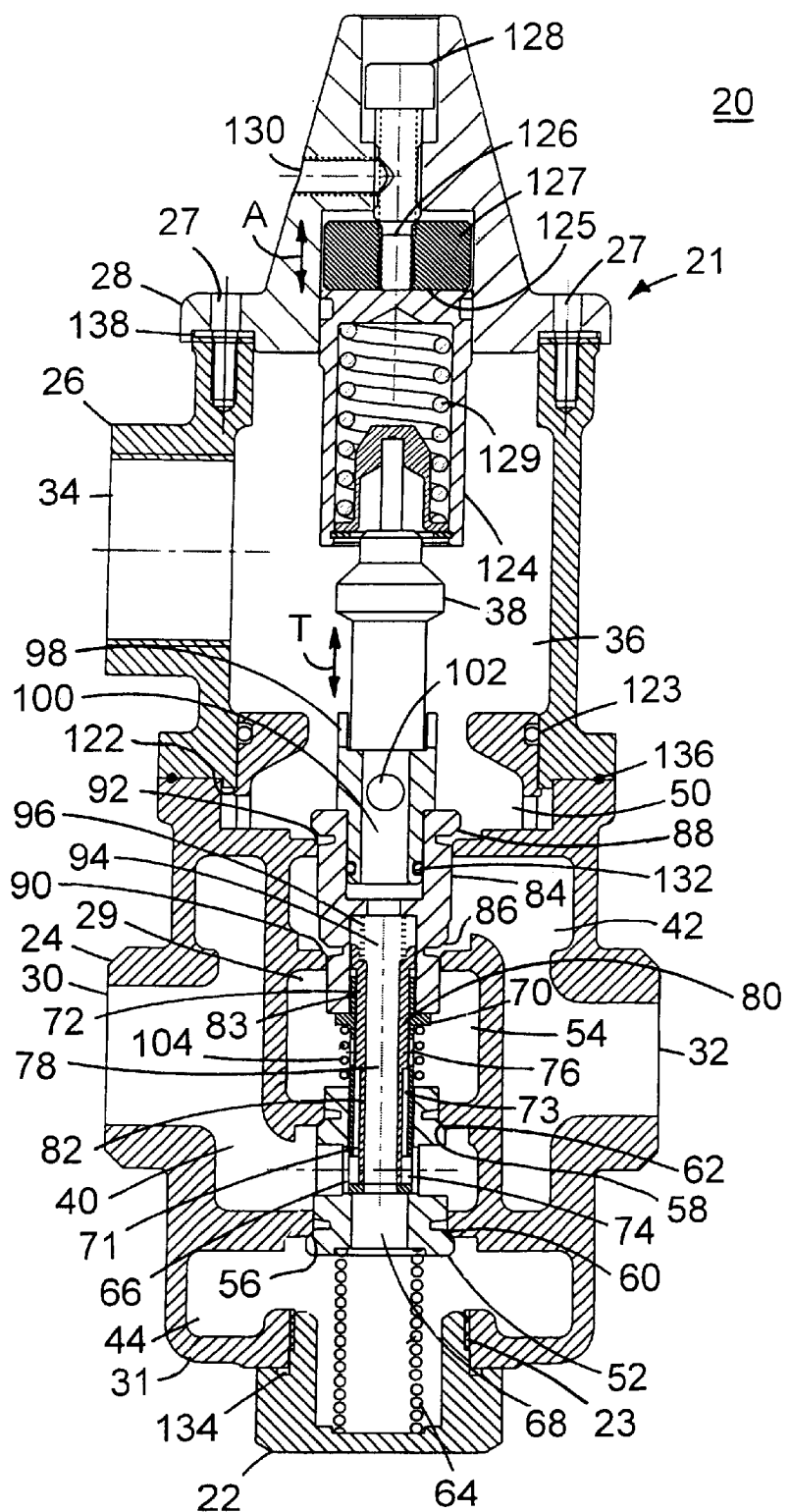
FIG. 1 is a cross sectional view of an embodiment of a mixing valve.
Figure 2:
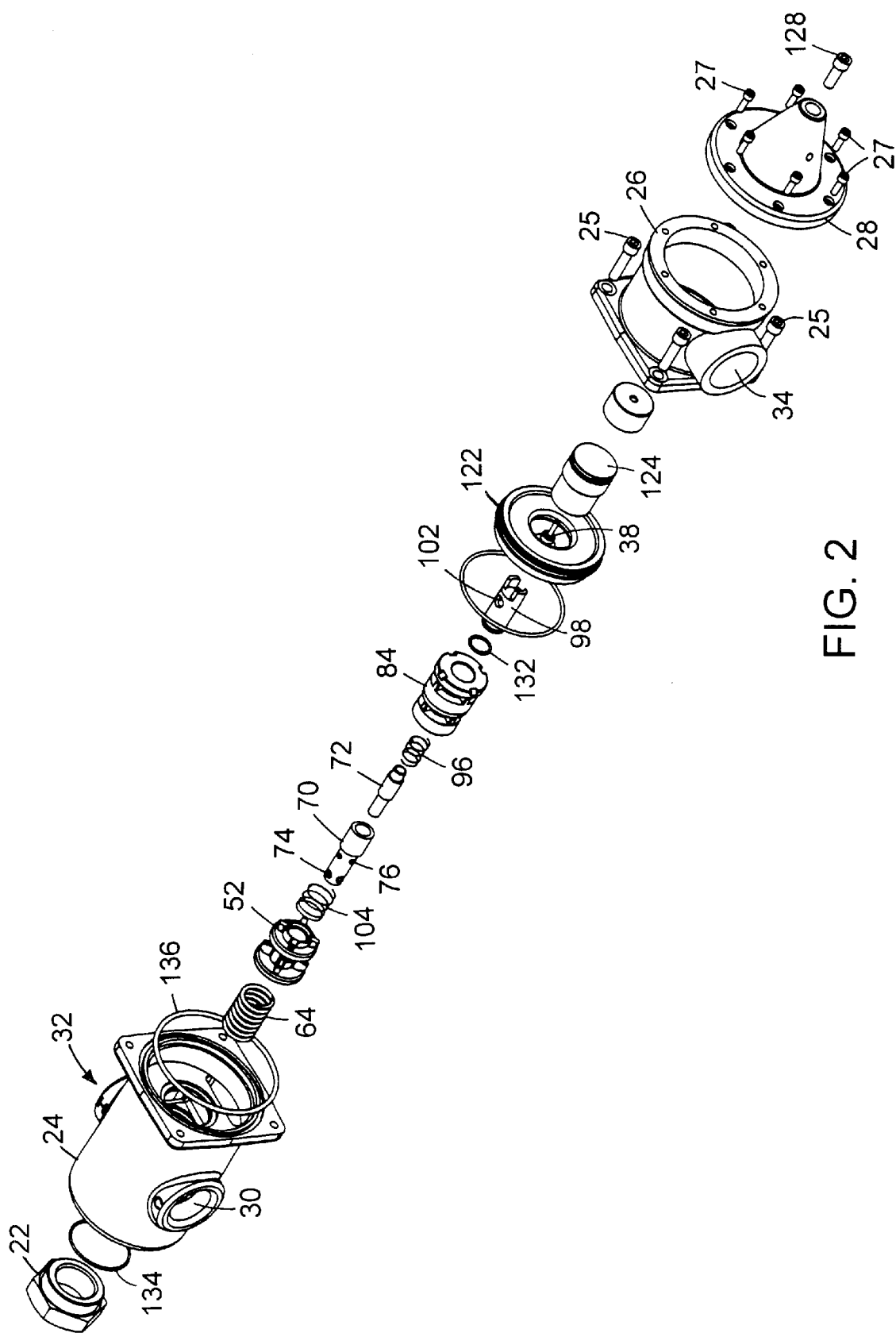
FIG. 2 is an exploded perspective view of the mixing valve of FIG. 1.

Referring to FIGS. 1 and 2, a mixing valve 20 includes a manifold 21 formed of a bottom cap 22, a bottom housing 24 connected to the bottom cap by a threaded connection 23, a top housing 26 connected to the bottom housing by screws 25, and an etched bonnet 28 connected to the top housing by screws 27. Bottom housing 24 defines a cold water inlet 30 and a hot water inlet 32 through which cold and hot water, respectively, are delivered into valve 20. Top housing 26 defines a mixing chamber 36 and a water outlet 34. Located within mixing chamber 36 is a temperature-responsive device 38 that, under normal operation, regulates flow of hot and cold water to mixing chamber 36.

In general, mixing valve 20 can be used to deliver tempered water, no water, or cold water, for example, to an emergency drench shower or an eyewash fountain. Under normal operation, cold water enters cold water inlet 30, hot water enters hot water inlet 32, and the two fluids mix in valve 20 such that tempered water of a predetermined maximum temperature is delivered through outlet 34. In the event that cold water is not supplied to inlet 30 (e.g., cold water supply failure), mixing valve 20 shuts off the flow of hot water through outlet 34, thereby reducing the risk of scalding or burns from the hot water. In the event that hot water is not supplied to inlet 32 (e.g., hot water supply failure) or temperature-responsive device 38 fails, mixing valve 20 is capable of continuing to supply cold water to outlet 34. As described below, mixing valve 20 includes a dual by-pass mechanism 29 that includes a pressure sensing by-pass and a temperature sensing by-pass. In the event that valve 20 cannot deliver tempered fluid, the dual by-pass mechanism provides the valve with a redundant system to deliver cold water to a user.

Figure 3A:
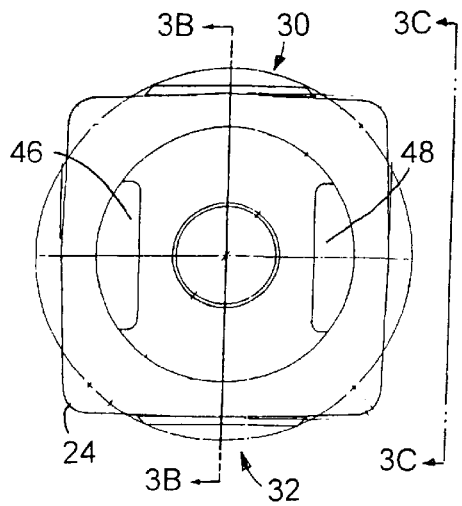
FIG. 3A is a top view of a bottom housing of the mixing valve of FIG. 1.
Figure 3B:
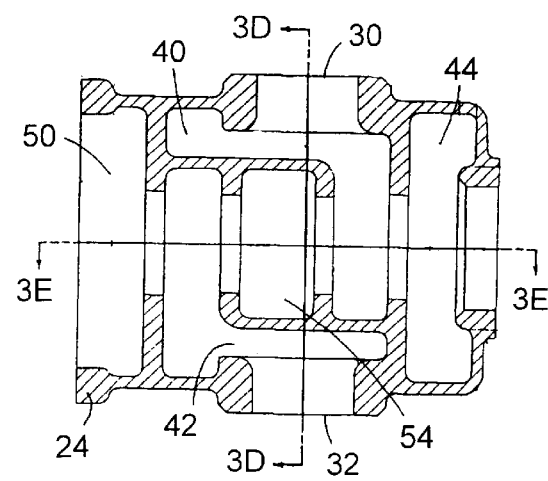
FIG. 3B is a cross sectional view of the bottom housing of FIG. 3A, taken along line 3B—3B.
Figure 3D:
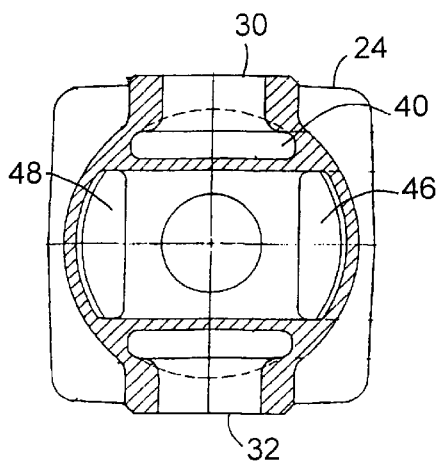
FIG. 3D is a cross sectional view of the bottom housing of FIG. 3B, taken along line 3D—3D.
Figure 3C:
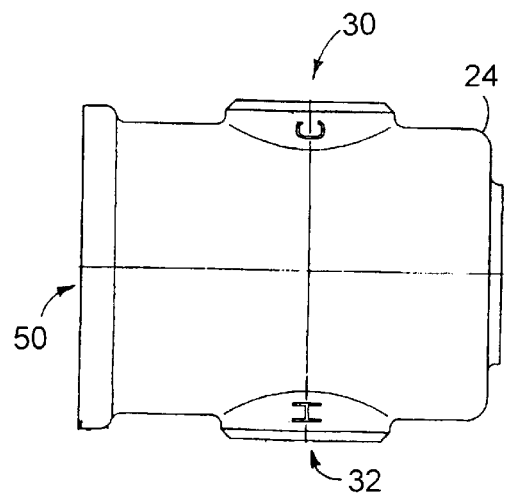
FIG. 3C is a side view of the bottom housing of FIG. 3A, taken along line 3C—3C.
Figure 3E:
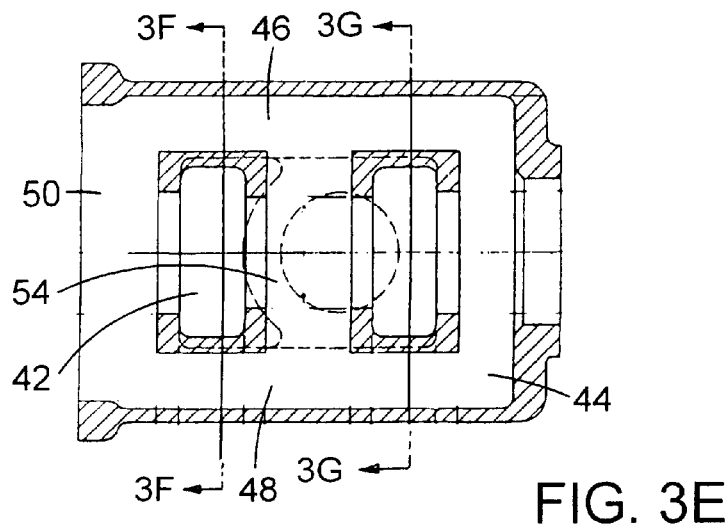
FIG. 3E is a cross sectional view of the bottom housing of FIG. 3, taken along line 3E—3E.
Figure 3F:
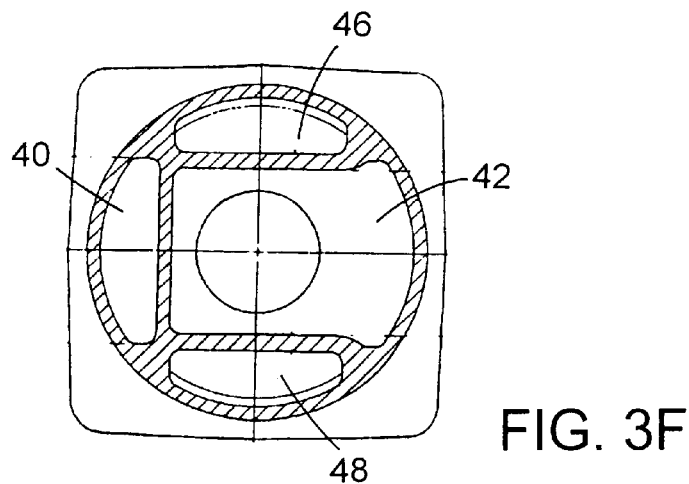
FIG. 3F is a cross sectional view of the bottom housing of FIG. 3E, taken along line 3F—3F.
Figure 3G:
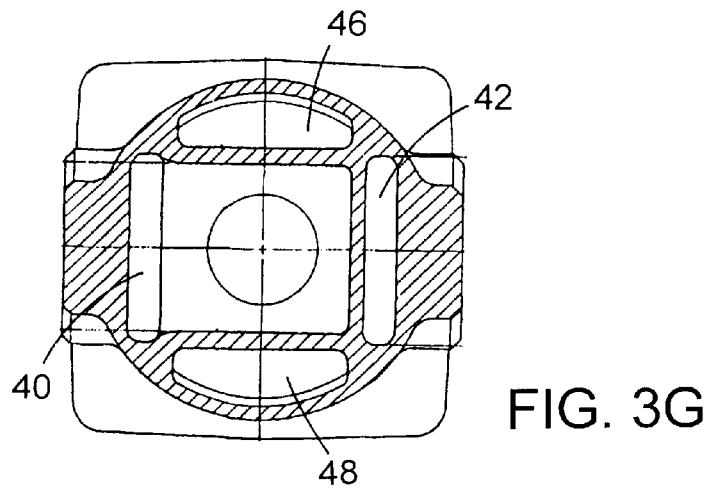
FIG. 3G a cross sectional view of the bottom housing of FIG. 3E, taken along line 3G—3G.

Bottom housing 24 includes a manifold 31 (e.g., cast from bronze) for directing cold and hot water to mixing chamber 36. Referring to FIGS. 1 and 3A–3G, cold water inlet 30 is in fluid communication with a cold water cavity 40, and hot water inlet 32 is in fluid communication with a hot water cavity 42. Cold water cavity 40 is in fluid communication with a bottom cavity 44 (FIG. 3B), which in turn is in fluid communication with a front cavity 46 and a back cavity 48 (FIG. 3E). Front and back cavities 46 and 48 lead to a top cavity 50 that is in fluid communication with mixing chamber 36 (FIGS. 1 and 3E). Cold water cavity 40 is also in fluid communication with a center cavity 54 (FIG. 3B). Like bottom cavity 44, center cavity 54 is also in fluid communication with front and back cavities 46 and 48, and thus also with top cavity 50 and mixing chamber 36 (FIGS. 1 and 3E).

Referring particularly to FIGS. 3B and 3E, hot water cavity 42 is in fluid communication with center cavity 54. Like cold water cavity 40, hot water cavity 42 is, via center cavity 54, in fluid communication with front and back cavities 46 and 48, top cavity 50, and mixing chamber 36. Hot water cavity 42 is also more directly in fluid communication with mixing chamber 36 via top cavity 50 (FIG. 1).

Referring again to FIGS. 1 and 2, valve 20 includes a cold water poppet 52 located between cold water cavity 40 and bottom cavity 44. Cold water poppet 52 defines an annular bottom sealing surface 56 and an annular top sealing surface 58. Sealing surfaces 56 and 58 are configured to engage bottom and top seats 60 and 62, respectively, which are defined by bottom housing 24. Surfaces 56 and 58 and seats 60 and 62 are generally configured to controllably restrict flow of cold water (via temperature-responsive device 38) from cold water cavity 40 to other parts of valve 20. Cold water poppet 52 is supported, in part, by a return spring 64 located in bottom cavity 44 that biases sealing surfaces 56 and 58 toward seats 60 and 62, respectively (i.e., away from body cap 22). Cold water poppet 52 further defines four side openings 66 and a central lumen 68 in fluid communication with the side openings. Central lumen 68 extends through the length of cold water poppet 52.

Within central lumen 68, cold water poppet 52 slidably receives a cold water bypass plug 70, which slidably receives a pressure relief poppet 72. Cold water bypass plug 70 defines four bottom openings 74 and four top openings 76 (FIG. 2). Bottom openings 74 align with side openings 66 of cold water poppet 52; and top openings 76 are in fluid communication with center cavity 54. Pressure relief poppet 72 defines a central lumen 78 extending through its length. Pressure relief poppet 72 has a cylindrical outer portion 80 that slides within the inner wall 71 of cold water bypass plug, and a narrower, bottom outer portion 82. Thus, as viewed in FIG. 1, when pressure relief poppet 72 is positioned down relative to cold water bypass plug 70, cylindrical outer portion 80 blocks top openings 76. As described further below, when pressure relief poppet 72 slides up, cold water can flow through a gap 73 defined between narrower bottom outer portion 82 and the inner wall of cold water bypass plug 70, and through top side openings 76.

Figure 4:
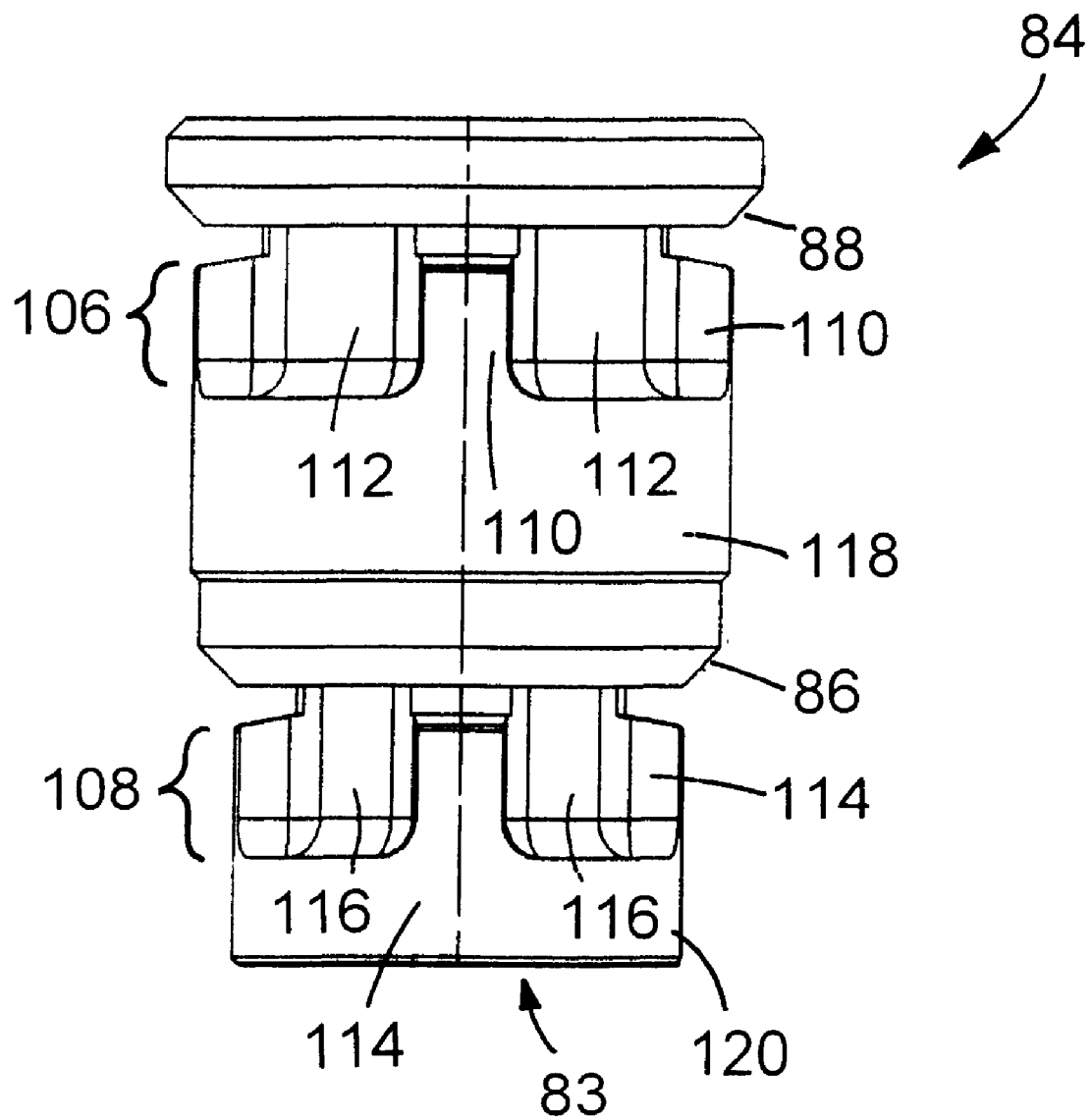
FIG. 4 is a side view of an embodiment of a hot water poppet.

Cold water bypass plug 70 engages a bottom portion of a hot water poppet 84 that extends from center cavity 54, through hot water cavity 42, and into top cavity 50. Referring to FIG. 4, hot water poppet 84 defines an annular bottom sealing surface 86 and an annular top sealing surface 88. Sealing surfaces 86 and 88 are configured to engage bottom and top seats 90 and 92, respectively, that are defined by bottom housing 24 (FIG. 1). Surfaces 86 and 88 and seats 90 and 92 are generally configured to controllably restrict flow of hot water (via temperature-responsive device 38) from hot water cavity 42 to other parts of valve 20. Hot water poppet 84 further defines two ribbed sections 106 and 108. During normal operation, ribbed section 106 is positioned below seat 92, and ribbed section 108 is positioned above seat 90, as viewed in FIG. 1. Ribbed section 106 includes four ribs 110 with a cut-away section 112 defined therebetween. Ribbed section 108 includes four ribs 114 with a cut-away section 116 defined therebetween. Hot water poppet 84 includes a top cylindrical portion 118 below ribbed section 106, and a bottom cylindrical portion 120 below ribbed section 108. As described below, along with a torsional device failure spring 104 (FIG. 1) located around cold water bypass plug 70, cylindrical portions 118 and 120 are used to restrict hot water flow in the event temperature-responsive device 38 fails. Failure spring 104 is positioned between hot water poppet 84 and cold water poppet 52, and biases the hot water poppet upwardly, as viewed in FIG. 1.

Referring again to FIG. 1, hot water poppet 84 defines a central lumen 94 extending through its length. At its bottom end 83, hot water poppet 84 receives cold water bypass plug 70 and pressure relief poppet 72 in lumen 94. Positioned in lumen 94 is a pressure relief spring 96 that biases pressure relief poppet 72 downwardly, as viewed in FIG. 1. At the top end of lumen 94, hot water poppet 84 receives a device adaptor 98 that extends between top cavity 50 (of bottom housing 24) and mixing chamber 36 (of top housing 26). Located between adaptor 98 and hot water poppet 84 is an O-ring seal 132. Device adaptor 98 defines a longitudinally-extending lumen 100 and two openings 102. Lumen 100 and openings 102 are in fluid communication with central lumen 94 of hot water poppet 84.

Device adaptor 98 is connected to temperature-responsive device 38, which extends into mixing chamber 36. Positioned between top cavity 50 and mixing chamber 38 is a funnel 122 that directs water flow, e.g., relatively low flow, to temperature-responsive device 38. Funnel 122 includes an O-ring seal 123. Temperature-responsive device 38 extends into an overload housing 124, which has an end 125 that rests against a set screw 126 that is acted upon by an adjustment screw 128. Rotation of adjustment screw 128 moves set screw 126 and a temperature limit spacer 127 located in overload housing 124 axially (arrow A), which acts on temperature-responsive device 38 to set a predetermined tempered water temperature. The position of adjustment screw 128 can then be fixed by a set screw 130. Temperature limit spacer 127 limits the temperature (e.g., 95° F.) that a user can adjust temperature-responsive device 38. Also located in overload housing 124 is a spring 129 that acts as an overload protection device, e.g., by compressing if valve 20 is over-adjusted to a cold setting or by compressing if device 38 detects excessive hot temperatures and tries to overly compress sealing surfaces 86 and 88 against seats 90 and 92, respectively.

Temperature-responsive device 38 is responsive to the temperature of water in mixing chamber 36 and expands or contracts axially (arrow T) with the temperature of the water in the mixing chamber. As viewed in FIG. 1, expansion of device 38 causes mechanically coupled adaptor 98, hot water poppet 84, cold water bypass plug 70, and cold water poppet 52 to move downwardly. As a result, the spacing between sealing surfaces 86 and 88 and their corresponding seats decreases, and the spacing between sealing surfaces 56 and 58 and their corresponding seats increases. That is, hot water flow decreases and cold water flow increases. Contraction of device 38 causes mechanically coupled adaptor 98, hot water poppet 84, cold water bypass plug 70, and cold water poppet 52 to move upwardly (via spring 64). As a result, the spacing between sealing surfaces 86 and 88 and their corresponding seats increases, and the spacing between sealing surfaces 56 and 58 and their corresponding seats decreases. That is, hot water flow increases and cold water flow decreases. Thus, by controlling the spacing between sealing surfaces 56, 58, 86, and 88 and their corresponding seats, temperature-responsive device 38 controls the amount of hot and cold water delivered to outlet 34. Temperature-responsive device 38 can be a wax thermostatic element (such as those available from Vemet (France) and Kerox (Hungary)), a bimetal sensor, or a liquid-filled thermostatic element. Wax thermostatic elements are also described in Vemet, U.S. Pat. No. 2,396,138, the entire disclosure of which is incorporated by reference.

Valve 20 further includes O-rings 134 and 136, and a bonnet gasket 138 to provide tight seals between bottom cap 22 and bottom housing 24, between the bottom housing and top housing 26, and between the top housing and etched bonnet 28, respectively.

Still referring to FIG. 1, in normal operation, valve 20 provides tempered water of a predetermined maximum temperature through outlet 34 according to the setting of temperature-responsive device 38. Cold water from a cold water supply flows through cold water inlet 30 and into cold water cavity 40. From cold water cavity 40, there are two paths that cold water flows through to reach outlet 34. Cold water flows between bottom sealing surface 56 and seat 60, and into bottom cavity 44. Referring to FIG. 3E, from bottom cavity 44, cold water flows through front and back cavities 46 and 48, to top cavity 50, and into mixing chamber 36. Cold water also flows between top sealing surface 58 and seat 62, and into center cavity 54. From center cavity 54, cold water also flows through front and back cavities 46 and 48, to top cavity 50, and into mixing chamber 36.

At the same time, hot water from a hot water supply flows through hot water inlet 32 and into hot water cavity 42. As with cold water, there are two paths that hot water flows through to reach outlet 34. Hot water flows between bottom sealing surface 86 and seat 90 (specifically through cut-away sections 116), and into center cavity 54 where it mixes with cold water. From center cavity 54, hot water (now mixed with cold water) flows through front and back cavities 46 and 48, to top cavity 50, and into mixing chamber 36 (FIG. 3E). Along this flow path, (mixed) hot and cold water is mixed with more cold water flowing from bottom cavity 44 toward mixing chamber 36. Hot water also flows through cut-away sections 112 of hot water poppet 84, between top sealing surface 88 and seat 92, into top cavity 50, and into mixing chamber 36. When hot water flows into top cavity 50, it mixes with mixed water flowing from front and back cavities 46 and 48.

During operation, temperature-responsive device 38 responds to the temperature in mixing chamber 38, and expands or contracts appropriately to adjust the gaps between sealing surfaces 56, 58, 86, and 88 and their corresponding seats, thereby regulating the temperature of water delivered through outlet 34. If the temperature inside mixing chamber 36 is too hot, device 38 expands (i.e., moves downwardly, as viewed in FIG. 1, overcoming the spring forces of springs 104 and 64) to narrow the gaps between sealing surfaces 86 and 88 and their corresponding seats, and to widen the gaps between sealing surfaces 56 and 58 and their corresponding seats. As a result, the flow of hot water to mixing chamber 36 is reduced, and the flow of cold water to the mixing chamber is increased. If the temperature inside mixing chamber 36 is too cold, device 38 contracts (i.e., moves upwardly and now aided by springs 104 and 64) to widen the gaps between sealing surfaces 86 and 88 and their corresponding seats, and to narrow the gaps between sealing surfaces 56 and 58 and their corresponding seats. As a result, the flow of hot water to mixing chamber 36 is increased, and the flow of cold water to the mixing chamber is reduced. Thus, valve 20 regulates the relative volumes of hot and cold water flow to provide mixed, tempered water of a predetermined temperature to outlet 34.

Figure 5:
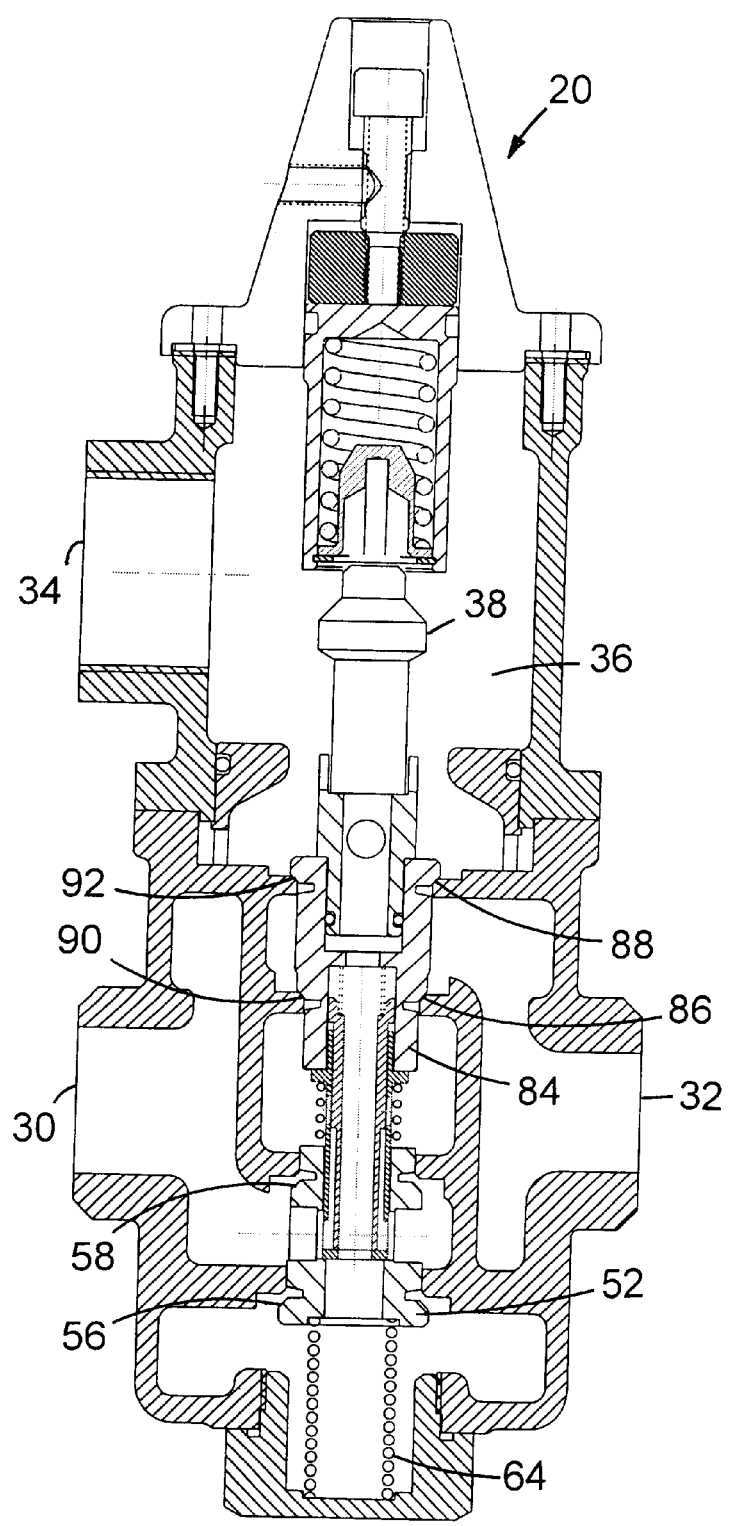
FIG. 5 is a cross sectional view of the mixing valve of FIG. 1 during a cold water failure.

In the event that cold water is not supplied to cold water inlet 30 (e.g., cold water failure) expansion of temperature-responsive device 38 acts to restrict hot water flow to outlet 34. Referring to FIG. 5, when the temperature of water in mixing chamber 36 increases above the set predetermined temperature, e.g., about 12° F. above the set temperature, temperature-responsive device 38 expands and pushes hot water poppet 84 down to engage sealing surfaces 86 and 88 in sealing contact with seats 90 and 92, respectively. Hot water flowing from hot water cavity 42 to outlet 34 is thus limited. As a result, scalding or burns from hot water is reduced.

When cold water is restored, cold water can flow to mixing chamber 36 (e.g., between sealing surfaces 56 and 58 and their corresponding seats), as in normal operation (described above). In response to the cold water flow, temperature-responsive device 38 contracts to disengage the seals between surfaces 86 and 88 and their corresponding seats, thereby allowing hot water to flow to mixing chamber 36. Valve 20 can then regulate cold and hot water flow to provide tempered water as described above.

Figure 6:
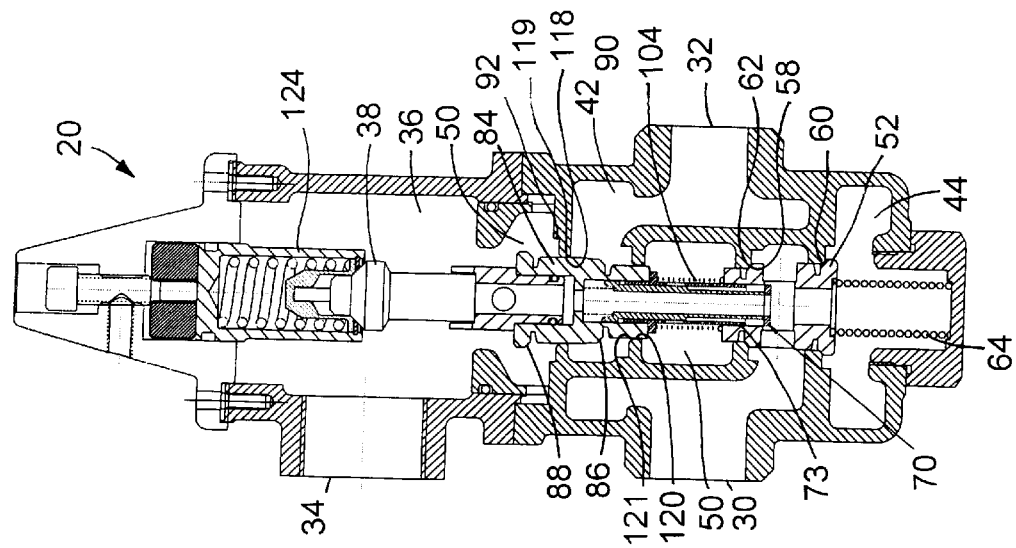
FIG. 6 is a cross sectional view of the mixing valve of FIG. 1 during a hot water failure in which a pressure-activated by-pass mechanism is activated.

In the event that hot water is not supplied to hot water inlet 32, valve 20 is configured to be able to continue providing cold water through two by-pass mechanisms. Referring to FIG. 6, when the temperature of water in mixing chamber 36 decreases below the predetermined temperature (e.g., due to lack of hot water), temperature-responsive device 38 contracts (i.e., moves upwardly as viewed in FIG. 1). As a result, return spring 64 biases cold water poppet 52 upwardly to engage sealing surfaces 56 and 58 in sealing contact with seats 60 and 62, respectively. Cold water flow through its paths under normal operation is limited. Additionally, device failure spring 104 biases hot water poppet 84 upwardly such that hot water is restricted from exiting hot water cavity 42. Specifically, spring 104 pushes hot water poppet 84 upwardly such that sealing surfaces 86 and 88 are raised over seats 90 and 92, respectively. Cylindrical (non-ribbed) portions 118 and 120 are pushed up to engage in sealing contact with portions 119 and 121, respectively, of bottom housing 24. Portion 119 is between hot water cavity 42 and top cavity 50, and portion 121 is between hot water cavity 42 and center cavity 54. When hot water flow is restored, hot water can flow, e.g., trickle, between hot water poppet 84 and portions 119 and 121 and into mixing chamber 36.

Figure 7:
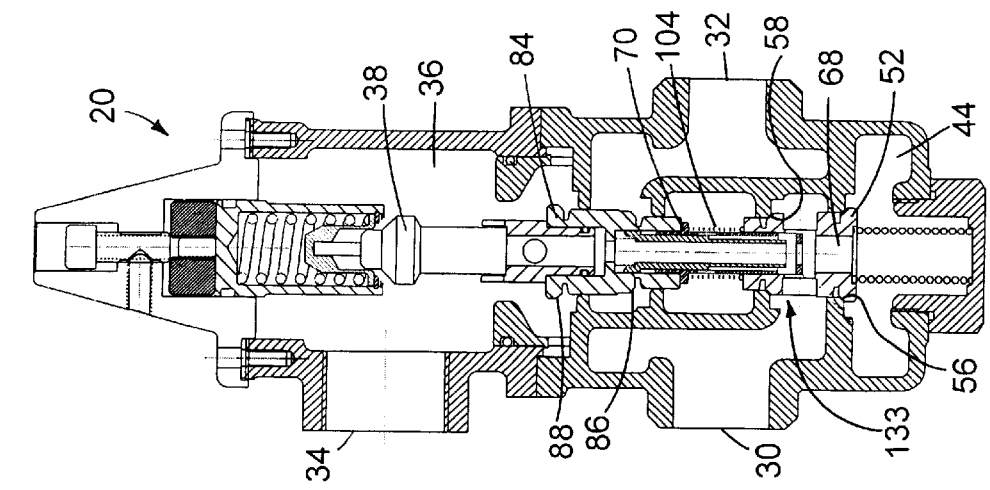
FIG. 7 is a cross sectional view of the mixing valve of FIG. 1 during a hot water failure in which a temperature-activated by-pass mechanism and a pressure-activated by-pass mechanism are activated.

Cold water, however, can still be provided, first through a pressure-activated by-pass mechanism 131 and then through a temperature-activated by-pass mechanism 133 (FIGS. 6 and 7). Pressure-activated by-pass mechanism 131 includes cold water bypass plug 70, pressure relief poppet 72, pressure relief spring 96, and cold water poppet 52. As cold water flows through bottom openings 74 of cold water bypass plug 70, into through gap 73 between narrow bottom portion 82 and the inner wall of bypass plug 70, the cold water pressure moves pressure relief poppet 72 upwardly, as viewed in FIG. 6, overcoming the spring force of (i.e., compresses) pressure relief spring 96. The upward movement of pressure relief poppet 72 moves outer portion 80 no longer blocks top openings 76. Cold water can flow from gap 73, through top openings 76, and into center cavity 54. From center cavity 54, cold water flows to mixing chamber 36 and outlet 34, as described above. Additionally, cold water flows through lumen 78 of pressure relief poppet 72, through central lumen 94 of hot water poppet 84, through lumen 100 and opening 102 of device adaptor 98, into mixing chamber 36, and to outlet 34. (During normal operation, cold water does not flow through lumen 78 since pressure relief poppet 72 is down (as viewed in FIG. 1), and narrow bottom portion 82 blocks openings 66 of cold water poppet 52.) Cold water is also allowed to flow through central lumen 68 of cold water poppet 52, down to bottom cavity 44, and to mixing chamber 36 via front and back cavities 46 and 48, as described above When temperature-responsive device 38 contracts in response cold water in mixing chamber 36, temperature-activated by-pass mechanism 133 is activated. Temperature-activated by-pass mechanism 133 includes temperature-responsive device 38, spring 104, cold water bypass plug 70, and cold water poppet 52. Referring to FIG. 7, as temperature-responsive device 38 contracts in response to the cold water in mixing chamber 36, spring 104 is allowed to expand, moving cold water bypass plug 70 upwardly. As a result, more cold water is allowed to flow through central lumen 68 of cold water poppet 52, down to bottom cavity 44, and to mixing chamber 36 via front and back cavities 46 and 48, as described above. The temperature-activated by-pass mechanism increases the flow of cold water through outlet 34.

When hot water is restored through valve 20, hot water flows past sections 118 and 120 of hot water poppet 84 and to mixing chamber 36. In response to the hot water flow, temperature-responsive device 38 regulates sealing surfaces 56, 58, 86, and 88 as in normal operation to provide tempered water through outlet 34. Cold water bypass plug 70 and pressure relief poppet 72 return to their positions as in normal operation, i.e., move downwardly as viewed in FIG. 7.

Figure 8:
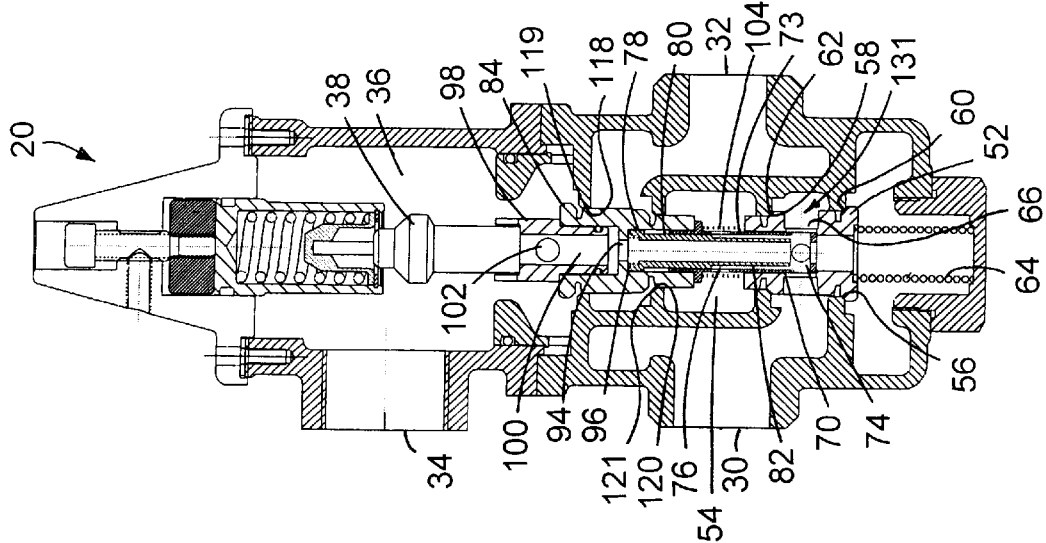
FIG. 8 is a cross sectional view of the mixing valve of FIG. 1 during a temperature-responsive device failure.

Referring to FIG. 8, in the event that temperature-responsive device 38 fails, valve 20 is configured to shut off hot water flow, and to be able to continue providing cold water through the two by-pass mechanisms. When temperature-responsive device 38 fails or malfunctions, it is configured to contract fully or substantially fully (i.e., collapse into overload housing 124). As in hot water failure, return spring 64 biases cold water poppet 52 upwardly to engage sealing surfaces 56 and 58 in sealing contact with seats 60 and 62, respectively; and cold water is restricted from flowing through its paths under normal operation. Additionally, as described above, device failure spring 104 biases hot water poppet 84 upwardly such that sealing surfaces 86 and 88 are raised over seats 90 and 92, respectively, and cylindrical (non-ribbed) portions 118 and 120 are pushed upwardly to engage in sealing contact with portions 119 and 121, respectively. Consequently, hot water is restricted from exiting hot water cavity 42.

Cold water, however, is capable of being provided through dual by-pass mechanisms 131 and 133, as described above. That is, through the pressure-activated by-pass mechanism, cold water flows through gap 73, into center cavity 54, then into mixing chamber 36, and through outlet 34. Subsequently, through the temperature-activated by-pass mechanism, cold water flows through cold water poppet 52, into bottom cavity 44, then into mixing chamber 36, and through outlet 34. As a result, in the event temperature-responsive device 38 fails or malfunctions, valve 20 fails cold, i.e., is capable of providing cold water.

In other embodiments, the temperature-activated by-pass mechanism is activated before the pressure-activated by-pass mechanism is activated. Cold water (e.g., residual cold water) in mixing chamber 36 causes temperature-responsive device 38 to contract, thereby allowing spring 104 to push cold water bypass plug 70 up. As a result, cold water can flow through cold water poppet 52 and into mixing chamber 36 (e.g., FIG. 7). Subsequently, cold water can flow through gap 73 to activate the pressure-activated by-pass mechanism, and then flow to mixing chamber 36.

In other embodiments, valve 20 can be used for fluids other than water.

Terms, such as"top","bottom","front","back", "downwardly", and "upwardly", are used to describe the embodiment as shown in the orientation of the figures, and not intended to be limiting.

Other embodiments are within the claims.

What is claimed is:

1. A mixing valve, comprising:
    a manifold defining a cold fluid inlet, a hot fluid inlet, a fluid outlet in fluid communication with the cold fluid inlet and the hot fluid inlet, and a mixing chamber in fluid communication with the cold fluid inlet, the hot fluid inlet, and the fluid outlet;
    a temperature-responsive device capable of regulating the volume of flow from the cold and hot fluid inlets to the mixing chamber;
    a first by-pass mechanism responsive to pressure of cold fluid flow in the manifold to allow cold fluid to flow between the cold fluid inlet and the fluid outlet; and
    a second by-pass mechanism associated with the temperature-responsive device, the second by-pass mechanism being responsive to fluid temperature in the manifold to allow cold fluid to flow between the cold fluid inlet and the fluid outlet.

2. The mixing valve of claim 1, wherein the temperature-responsive device is associated with a first sealing surface and a second sealing surface, the manifold further defines a first seat configured to engage with the first sealing surface, and a second seat configured to engage with the second sealing surface, and the temperature-responsive device is responsive to changes in fluid temperature to control positioning of the first and second surfaces relative to the first and second seats, respectively.

3. The mixing valve of claim 1, wherein the temperature-responsive device is configured to regulate the relative volumes of flow from the cold and hot fluid inlets to the mixing chamber in response to a predetermined temperature setting.

4. The mixing valve of claim 1, wherein the first by-pass mechanism is responsive to a pressure differential between cold fluid flow and a constant force.

5. The mixing valve of claim 4, further comprising a spring applying the constant force.

6. The mixing valve of claim 1, wherein the first by-pass mechanism includes a first body and a second body associated with the first body, the second body being responsive to a pressure differential and movable relative to the first body to allow flow of cold fluid through the first body.

7. The mixing valve of claim 6, wherein the first body slidably receives the second body.

8. The mixing valve of claim 1, wherein the second by-pass mechanism is associated with the first by-pass mechanism, and is capable of increasing cold fluid flow allowed by the first by-pass mechanism.

9. The mixing valve of claim 8, wherein the first and second by-pass mechanisms are mechanically coupled.

10. A mixing valve, comprising:
    a manifold defining a cold fluid inlet, a hot fluid inlet, a fluid outlet in fluid communication with the cold fluid inlet and the hot fluid inlet, a mixing chamber in fluid communication with the cold fluid inlet, the hot fluid inlet, and the fluid outlet, a first seat, and a second seat;
    a temperature-responsive device associated with a first sealing surface configured to engage with the first seat, and a second sealing surface configured to engage with the second seat, the temperature-responsive device being responsive to changes in temperature to adjust positioning of the first and second surfaces relative to the first and second seats, respectively, the positions of the first and second surfaces regulating the flow of cold and hot fluids to the mixing chamber;
    a first by-pass mechanism responsive to the pressure of cold fluid from the cold, fluid inlet to allow cold fluid to flow between the cold fluid inlet and the fluid outlet; and
    a second by-pass mechanism responsive to a temperature detected by the temperature-responsive device to allow cold fluid flow between the cold fluid inlet and the fluid outlet.

11. A method of supplying temperature-regulated fluid, comprising:
    flowing cold fluid from a cold fluid inlet of a manifold to a fluid outlet of the manifold through a first by-pass mechanism responsive to a pressure of cold fluid from the cold fluid inlet; and
    flowing cold fluid from the cold fluid inlet to the fluid outlet through a second by-pass mechanism responsive to a temperature of fluid flowing to the fluid outlet,
    wherein the cold fluid flows through the first and second by-pass mechanisms when a temperature-responsive device in the manifold malfunctions.

12. The method of claim 11, further comprising regulating flow of cold fluid from the cold fluid inlet to the fluid outlet, and regulating flow of hot fluid from a hot fluid inlet to the fluid outlet.

13. The method of claim 11, further comprising flowing cold fluid in response to the pressure and flowing cold fluid in response to the temperature when flow of hot fluid to the fluid outlet is restricted.

14. The method of claim 11, further comprising contracting a portion of the temperature-responsive device.

15. The method of claim 11, further comprising restricting flow of hot fluid from a hot fluid inlet of the manifold to the fluid outlet.

16. A method of supplying cold fluid to a fluid outlet of a valve manifold when flow of hot fluid to a hot fluid inlet is restricted or when a temperature-responsive device malfunctions, the manifold defining a first cold fluid flow path from a cold fluid inlet of the manifold to the fluid outlet of the manifold, and the hot fluid flow path from the hot fluid inlet of the manifold to the outlet, the method comprising:

flowing cold fluid from the cold fluid inlet to the fluid outlet through a second path different than the first cold fluid flow path in response to a pressure differential; and flowing cold fluid from the cold fluid inlet to the fluid outlet through a third path different than the first and second paths in response to a temperature of fluid flowing to the fluid outlet.

17. The method of claim 16, comprising regulating cold fluid flow through the first flow path, and hot fluid flow through the hot fluid flow path with a temperature-controlling device.

18. The method of claim 16, further comprising restricting the flow of hot fluid through the hot fluid flow path when the flow of cold fluid through the first path is restricted.

19. The method of claim 16, further comprising restricting flow of hot fluid through the hot fluid flow path when the temperature-responsive device in the manifold malfunctions.

20. The method of claim 16, further comprising restricting flow of cold fluid through the first flow path when the temperature-responsive device in the manifold malfunctions.

21. The method of claim 16, further comprising contracting a portion of the temperature-responsive device when the temperature-responsive device malfunctions.

22. A method of supplying temperature-regulated fluid, comprising:

flowing cold fluid from a cold fluid inlet to a fluid outlet through a first by-pass mechanism responsive to a pressure of cold fluid from the cold fluid inlet; and flowing cold fluid from the cold fluid inlet to the fluid outlet through a second by-pass mechanism responsive to a temperature of fluid flowing to the fluid outlet, wherein the cold fluid flows through the first and second by-pass mechanisms when flow of hot fluid to a hot fluid inlet is restricted during temperature-regulated operation.

23. The method of claim 22, further comprising regulating flow of cold fluid from the cold fluid inlet to the fluid outlet, and regulating flow of hot fluid from the hot fluid inlet to the fluid outlet.

24. The method of claim 22, further comprising flowing cold fluid in response to the pressure and flowing cold fluid in response to the temperature when a temperature-responsive device in the manifold malfunctions.

25. The method of claim 22, further comprising contracting a portion of the temperature-responsive device.

26. The method of claim 22, further comprising restricting flow of hot fluid from the hot fluid inlet of the manifold to the fluid outlet.

27. A method of supplying temperature-regulated fluid to a fluid outlet of a valve, the valve defining a cold fluid path from a fluid inlet of the valve to a fluid outlet of the valve, the method comprising:

flowing cold fluid from the fluid inlet to the fluid outlet through a second path different from the cold fluid path when flow of hot fluid is restricted or when a temperature-responsive device malfunctions.

28. The method of claim 27, comprising flowing cold fluid through the second path in response to a pressure of cold fluid from the fluid inlet.

29. The method of claim 27, comprising flowing cold fluid through the second path in response to a temperature of cold fluid from the fluid inlet.

30. The method of claim 27, comprising flowing cold fluid from the fluid inlet to the fluid outlet through a plurality of paths different from the cold fluid path.

* * * * *